United States Patent [19]
Benik et al.

[11] Patent Number: 5,399,399
[45] Date of Patent: Mar. 21, 1995

[54] SHIRRED CASING ARTICLE AND METHOD

[75] Inventors: Anthony G. Benik, Lisle; Jeffery A. Oxley, Naperville, both of Ill.

[73] Assignee: Viskase Corporation, Chicago, Ill.

[21] Appl. No.: 898,662

[22] Filed: Jun. 15, 1992

[51] Int. Cl.⁶ .............................................. A22C 13/00
[52] U.S. Cl. .................... 428/34.8; 138/118.1; 206/802
[58] Field of Search ............ 428/34.8; 138/118.1; 206/802; 426/105, 129, 135; 452/21; 229/DIG. 10; 427/338, 339

[56] References Cited
U.S. PATENT DOCUMENTS

| | | | |
|---|---|---|---|
| 3,528,825 | 9/1970 | Doughty | 99/176 |
| 4,033,382 | 7/1977 | Eichin | 138/118.1 |
| 4,346,738 | 8/1982 | Martinek | 138/118.1 |
| 4,484,679 | 11/1984 | Alfonas et al. | 206/303 |
| 5,046,219 | 9/1991 | Stanley | 452/30 |
| 5,215,495 | 6/1993 | Crevasse | 452/21 |

*Primary Examiner*—Charles R. Nold
*Attorney, Agent, or Firm*—R. Aceto

[57] ABSTRACT

A shirred casing article is composed of a cut length of fibrous casing and must be soaked prior to stuffing. A loop is attached at one end of the cut length for hanging the casing after stuffing. However prior to stuffing, the loop is extended longitudinally about the shirred casing article to maintain the integrity of the shirred casing during soaking. Thus the loop which functions as a means to suspend the casing after stuffing, functions before stuffing as a means to restrain longitudinal expansion of the shirred article.

7 Claims, 2 Drawing Sheets

SHIRRED CASING ARTICLE AND METHOD

TECHNICAL FIELD

The present invention relates to cellulosic food casings and more particularly to a cellulosic casing of the type which is customarily soaked in water prior to stuffing.

BACKGROUND OF THE INVENTION

Cellulose food casings in the form of tubes are well known in the art. They are of several types and sizes to accommodate the many types of food products which are processed and/or packaged in such casings.

One type of cellulose casing, commonly referred to as "fibrous casing" has a fibrous support web, usually paper, imbedded in the casing wall. Casings of this type generally are used in the preparation of larger diameter food products such as bologna and the like. Fibrous casing also is used in the production of sausage products of the type that are hung for cooking, drying or other processing. Products of this type for example include pepperoni and salami among others.

Fibrous casings are sold either as so called "cut lengths" or in shirred form. Cut-lengths are single pieces of casing of from about 1.52 to about 2.43 meters long which are provided in a flattened condition and which are suitable for making one or, at most, a few stuffed products. One end of the cut length of casing usually is preclosed with a clip or tie by the casing supplier as a convenience to the casing user. Also, if the cut length end use is to produce a sausage which is hung for processing, the casing supplier usually attaches a loop at the preclosed end. Generally this loop is kept as short as possible in order to make maximum use of the vertical space in the chambers where the stuffed casing is hung for processing.

A "shirred" casing is a much longer length of casing (30 meters and more) which has been gathered and pleated by mechanical means to form a shirred tube of casing. Shirred casings are used for producing a plurality of stuffed product lengths one after another on an automatic stuffing machine.

Casings generally are identified by size which represents a stuffing diameter recommended by the casing manufacturer for that particular casing. This recommended stuffed diameter (RSD) corresponds to a stuffed circumference which is greater than twice the flat width of the casing. Thus, the casing must be stretched circumferentially during stuffing to reach its RSD.

Both types of fibrous casing require a certain minimum moisture content to provide the casing with the flexibility and extensibility required for stuffing to the casing RSD. For shirred fibrous casings this moisture content either is added in controlled amounts by the casing manufacturer prior to shirring so it contains at least the minimum moisture needed for stuffing and is ready to stuff, or the casing is soaked in warm water, usually to saturation, by the casing user shortly prior to stuffing. Soaking by the user is the commonly accepted way of adding moisture to cut length casing.

After soaking, the flat cut length is gathered manually onto a stuffing horn. Gathering the flat wet casing onto a stuffing horn in this fashion is difficult, particularly for the sizes of casing as used in the production of pepperoni or other products having a stuffed diameter comparable to pepperoni i.e. about 40–50 mm. This is because the casing diameter is relatively small compared to the length of the casing and is not much larger than the stuffing horn diameter. Consequently when the flat wet casing is gathered onto the horn, the casing tends to cling to the horn surface. Also, since a cut length of casing usually is closed at one end, care must be taken to insure the interior of the casing is vented. Otherwise, the operation of gathering the casing onto the horn creates a partial vacuum within the casing which causes the casing to be pressed against the horn surface by atmospheric pressure. This further impedes the gathering of the full length of the casing onto the stuffing horn.

A shirred tube of casing is easier to position onto a stuffing horn. This is because the shirred tube has an open bore which facilitates entry of the stuffing horn into the casing and the shirred length is considerably shorter than the casing length. However, when shirred casing is soaked or otherwise moisturized by the casing user the added water swells the casing. This causes the shirred tube to expand longitudinally and the gathered pleats tend to separate so the shirred tube loses its integrity. To prevent this loss of longitudinal integrity and facilitate loading the moisturized shirred tube onto a stuffing horn, a common practice is to provide either an internal or external restraint to prevent longitudinal expansion of the fibrous casing as the casing imbibes moisture.

For example, a conventional internal restraint for shirred casing includes a plastic tube which extends through the bore of the shirred casing with washers or pegs at each end to hold the shirred casing in place on the plastic tube. A conventional external restraint generally is a net or perforated plastic shrink film which encompasses the entire outer surface of the shirred casing including at least a portion of its opposite ends.

The so called "tube and peg" internal restraint is not appropriate for use where one end of the casing is preclosed and conventional external restraints create an element of waste after removal.

The present invention provides a casing article which contains a length of casing comparable to a cut length. It requires the addition of moisture prior to stuffing yet is easier to load onto a stuffing horn than a conventional cut length, and it avoids the use of conventional internal or external restraints commonly used for shirred casings.

OBJECTS OF THE INVENTION

One object of the present invention is to provide a cut length of casing, closed at one end and in a form which is easy to load on a stuffing horn.

A further object is to provide a cut length of casing in the form of a shirred tube to facilitate loading onto a stuffing horn.

Yet another object is to provide a cut length of casing in the form of a shirred tube having means to resist longitudinal growth upon soaking.

SUMMARY OF THE INVENTION

In accordance with the present invention a casing article is provided which contains a length of fibrous casing comparable to a cut length of fibrous casing and having one preclosed end. The casing article lacks the moisture content needed to impart to the casing the degree of extensibility required for stuffing to a diameter recommended by the casing manufacturer. The recommended stuffed diameter (hereafter "RSD") is achievable by having the casing user moisturize the casing article, such as by soaking in water, just prior to stuffing. For example, the casing article prior to such moisture addition generally has a moisture content of about 10% or less based on total casing weight. After soaking, the casing may have a moisture content of upwards of 50% to 60% of total weight. At this moisture content, the casing is sufficiently extensible to permit stuffing the casing up to its RSD.

The casing article at its preclosed end includes a strap or loop which is commonly applied to cut length casings of this type for purposes of suspending the stuffed casing for cooking, curing, drying or other processing.

The loop and closure may comprise a cord to tie off one end of the casing with a portion of this tie forming the casing suspending loop. The loop also may be a separate structure attached to the closed end by a clip which also functions to close off the end of the casing. In either case, it generally is desired to use as short a loop as possible in order to make maximum use of the vertical space of the chambers in which the stuffed sausages are hung for drying or for further processing.

To facilitate loading the casing article of the present invention onto a stuffing horn, the cut length of casing contained in the article is supplied to the user in the form of a loosely shirred tube. This eliminates the need for the casing user to manually gather the 2 to 3 meters long cut length onto a stuffing horn. Instead, the user only has to load a relatively short, loosely shirred tube onto the stuffing horn. For example, a cut length about 1.5 meters long can be reduced to a loosely shirred tube about 7 to 8 cm. long. The shirred tube has a preformed bore with an open end so it is easily slipped onto the stuffing horn.

As noted above, any shirred tube of casing will tend to expand and lose longitudinal integrity when additional water is imbibed. Accordingly, the casing article of the present invention includes means to restrain the longitudinal expansion of the casing.

In the present invention the restraint is external and is disposed longitudinally about the shirred tube. Preferably the restraint is a strap, cord or the like, of either an elastic or inelastic material which is looped longitudinally about the shirred tube and is easily removed. Most preferably, the loop attached at the closed end of the casing as a suspension means after stuffing, is employed as the restraining means. In this respect, the loop is extended back and around the shirred tube from its point of attachment at the closed end of the shirred tube. Now when the shirred tube is moisturized, its longitudinal expansion is restrained by the loop which encircles the shirred tube longitudinally. The loop then is slipped from around the tube so the shirred tube can be loaded onto a stuffing horn. After stuffing, the loop, still attached to the casing, is used to suspend the stuffed casing.

As noted above, the loop, in general, should be kept as short as possible to maximize the length of stuffed casing which can be hung in a given vertical space. However, unlike the loops of the prior art used solely for suspending the stuffed casing, the loop, for purposes of the present invention must have a total length sufficient to extend longitudinally about the shirred tube composed of the cut length of casing.

For any given casing length and loop size it is within the skill of the art to adjust the shirring operation to produce a shirred tube length capable of fitting snug within the loop. In particular, the size of the loop eg. the distance around the loop, is such that the loop extends from the casing preclosed end and across the open end of the shirred tube such that the loop restrains the shirred tube from longitudinal growth which otherwise would occur when the casing is moisturized. If the cut length is excessively long and/or the loop is relatively short, some accommodation can be made to either the casing or loop to insure a snug fit of the loop about the shirred tube.

Thus the present invention may be characterized in one aspect thereof by a shirred casing article comprising a) a length of cellulosic casing having a low moisture content insufficient for stuffing to a recommended casing stuffed diameter, said low moisture casing being in shirred form to provide a tube of shirred casing composed of pleats formed one against another and defining a bore through said tube, and said pleats being capable of swelling and expanding longitudinally responsive to the imbibition of additional water by said casing;

b) said low moisture casing having a first end which is closed thereby closing the corresponding end of said bore and the opposite second end of said bore being open to permit entry of a stuffing horn into said bore;

c) hanger means attached to said casing at said closed end for suspending said casing after the stuffing thereof; and d) restraining means extending from said closed first end and removably disposed longitudinally about said tube of shirred casing and extending across the open second end of said bore for restraining the swelling and longitudinal expansion of said pleats comprising said tube of shirred casing responsive to imbibition of additional water by said casing.

In another aspect, the present invention is characterized by a method for forming a casing article comprising the steps of a) providing a length of cellulosic casing having a low moisture content insufficient to permit stuffing to a recommended stuffed diameter for said casing and said length of casing having means closing one end;

b) shirring the casing to form a shirred tube having an axial bore closed at said one end and open at an opposite second end;

c) extending a closed loop from the closed first end longitudinally about said shirred tube and diametrically across said bore open end, said loop being sized and constructed so as to restrain longitudinal growth of said shirred tube responsive to the imbibition of sufficient moisture to permit stuffing to the casing recommended stuffed diameter.

DETAILED DESCRIPTION OF THE INVENTION

Figure 1:
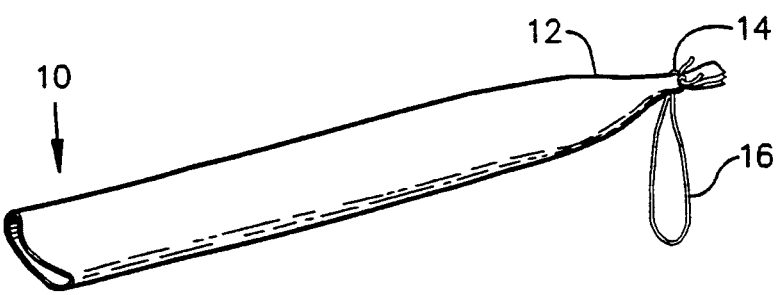
FIG. 1 illustrates a conventional cut length piece of casing.

Referring to the drawings, FIG. 1 shows a cut length of casing 10 in a flattened condition. For production of a pepperoni type product wherein each cut length is used to make one stuffed product, the casing is about 45 mm in diameter and preferably not over about three meters long.

One end 12 of the cut length is closed by gathering the casing towards its longitudinal axis and then tying. As shown in FIG. 1 the tie 14 is wrapped transversely about the casing and knotted so as to leave a loop 16 which is used to suspend the casing after stuffing. As an alternative, the casing can be closed by a metal or plastic clip wherein the clipping action attaches a separate loop to the casing. Apparatus for tying or clipping the casing so as to provide a loop for suspending the stuffed casing are well known in the art and the article 10 as shown in FIG. 1 is conventional.

Cut length casing is sold with a relatively low moisture content which is not sufficient to permit stuffing the casing to its RSD. The necessary water content most usually is provided by moisturizing the cut length just prior to stuffing. Moisturization can be accomplished by an suitable means such as spraying water on the casing but the most common method of moisturizing is by soaking the casing in warm (80° C.-100° C.) water. However as noted above, gathering 2 to 3 meters of a wet casing having one closed end onto a stuffing horn takes time and is not always easy to accomplish.

Figure 2:
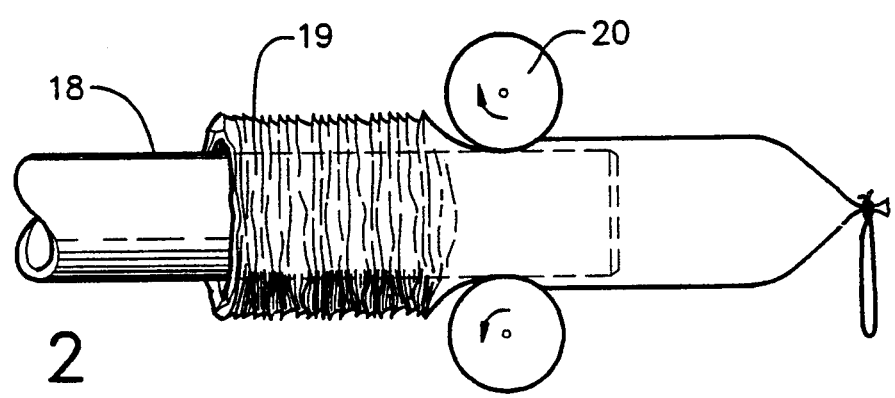
FIG. 2 illustrates the cut length of FIG. 1 undergoing a shirring operation.

Accordingly, in the present invention the cut length 10 is preshirred by the casing manufacturer. Various types of shirring mechanisms are known in the art. For purposes of the present invention a shirring mechanism is represented in FIG. 2 by shirring rolls 20. FIG. 2 shows that the cut length casing of FIG. 1 is fed onto a mandrel 18 where it is gathered into pleats about the mandrel by shirring rolls 20. It is known that relatively dry fibrous casing may be damaged by the shirring operation. A common practice is to humidify fibrous casing to soften it so the casing is better able to withstand the rigors of shirring. The selection of a moisture content for shirring is well within the skill in the art and depends, for example, on the type of shirring mechanism employed. Generally a moisture content of 15-20% of total weight would be sufficient for purposes of shirring the casing. After shirring, and absent a protective sheath to retain moisture, the casing in time will dry to an equilibrium moisture content of about 10% or less by total weight.

Figure 3:
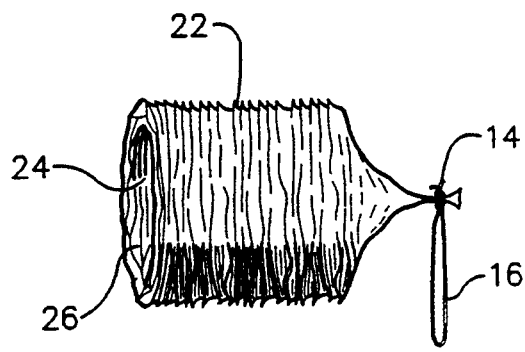
FIG. 3 and 4 illustrate steps in forming a shirred casing article of the present invention.

As a result of this shirring operation pleats 19 of the casing are formed one against another until the cut length is converted to a tube of shirred casing 22 (FIG. 3). The length of this tube of casing may vary depending upon the initial length of the cut length and the shirring density. The shirred length is at most 10 to 12 centimeters long and preferably not more than about 6 to 10 centimeters long. The pleats forming the shirred tube of casing also define an axial bore 24 which is about the same diameter as the mandrel on which the casing is shirred. Since the cut length is closed off by tie 14, at one end, the corresponding end of the bore is closed. At its opposite end 26, the bore is open to permit entry of a stuffing horn.

To permit stuffing the casing to its RSD, water is added, preferably by soaking, to the casing contained in the shirred tube 22. However, adding water swells the casing and causes the shirred tube to expand longitudinally so the pleats fall apart and the shirred tube loses its integrity.

Accordingly, in accordance with the present invention the shirred tube is restrained from longitudinal growth which otherwise would occur when moisture is added. This is accomplished by locating a restraining band longitudinally about the shirred tube. The restraining means may be a strap or elastic band wrapped longitudinally about the shirred tube. Preferably the loop 16 is used to provide this restraining band.

Figure 4:
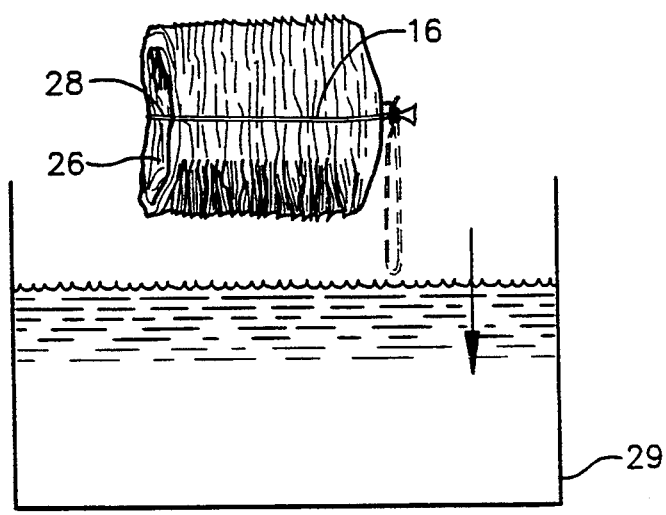

FIG. 4 shows that after shirring, the loop 16 is positioned longitudinally around the shirred tube. This is accomplished by moving the loop from a "free" position as shown in dotted line, and stretching it to a restraining position shown in solid line. In its restraining position the loop stretches from its point of attachment at the closed end of the casing, longitudinally back and around the shirred tube wherein a portion of the loop indicated at 28 extends diametrically across the bore opening 26. This forms a relatively compact casing article wherein the disposition of the loop 16 about the shirred tube is effective to hold the shirred pleats together. When the casing article is immersed in a soak tank 29, the casing imbibes water and swells. As the casing swells it presses on the loop 16 but the embracing disposition of the loop prevents the longitudinal expansion of the shirred tube so the integrity of the tube is maintained.

Figure 5:
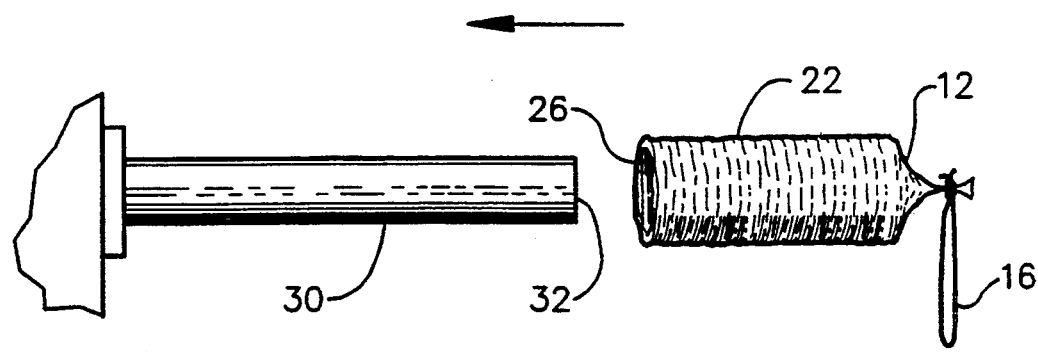
FIGS. 5 and 6 illustrate steps in using the casing article of the present invention.

After soaking to imbibe the additional moisture needed to allow stuffing the casing to its RSD, the loop is slipped off the shirred tube. The shirred tube 22 then is quickly loaded onto a stuffing horn 30 (FIG. 5) before it can longitudinally expand to any significant extent. The outlet end 32 of the stuffing horn is inserted into the open end 26 of the bore of the shirred tube and up to the closed end 12. Stuffing then commences and is carried out in a conventional fashion well known in the art.

Figure 6:
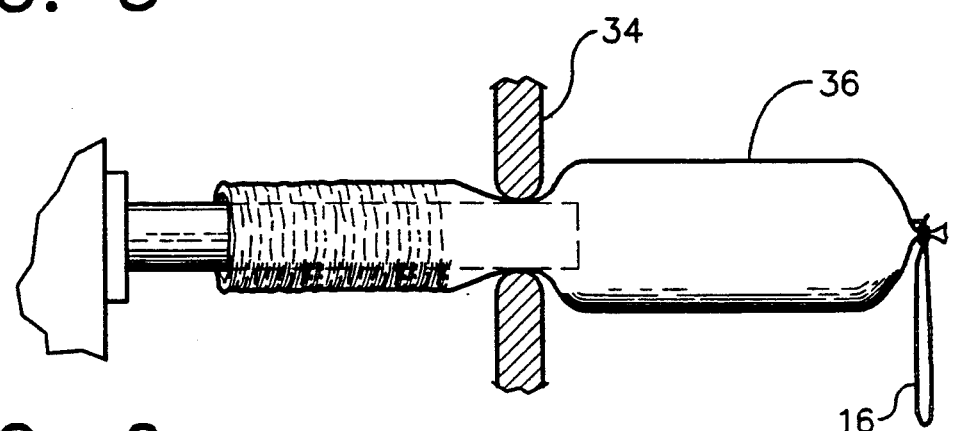

The stuffing operation as represented in schematic fashion in FIG. 6 involves placement of an external member 34 about the stuffing horn to snug the casing to the horn. Now when food produced is forced through the horn it will stuff and draw off casing from the horn to produce a stuffed casing product 36. When the cut length of casing has been stuffed, means (not shown) gather and close the trailing end of the casing.

Figure 7:
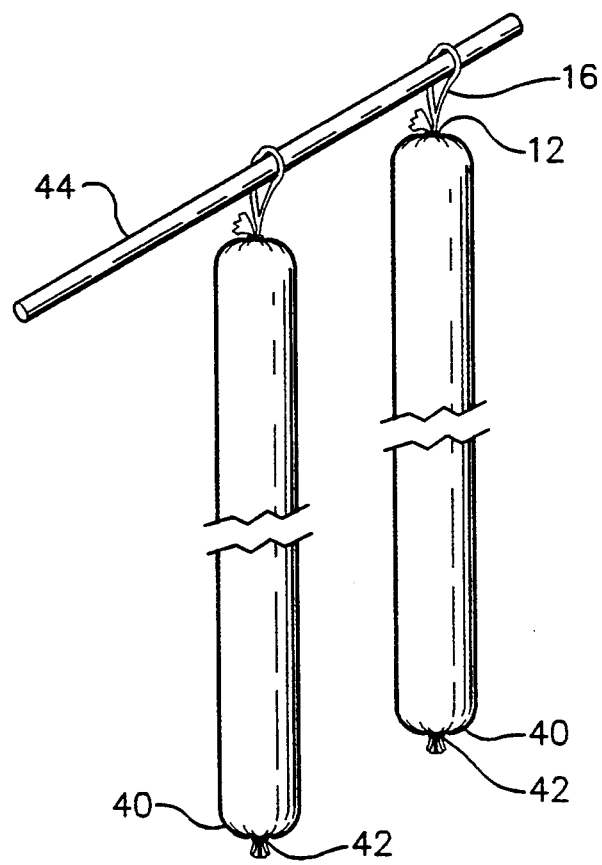
FIG. 7 is a view illustrating a stuffed casing suspended for processing.

FIG. 7 illustrates the casing after stuffing. In this respect the casing has its second end 40 gathered and closed by a clip 42 to encase a food product within the casing. The loop 16 at the preclosed end 12 of the casing then is used to suspend the stuffed casing from a support, such as bar 44, in a drying room or other processing chamber.

Thus, it should be appreciated that the present invention provides in a preshirred form, a cut length of casing having an attached loop for suspending the casing after stuffing. Moreover the loop, prior to stuffing, is disposed longitudinally about the shirred casing and performs the additional function of a restraining means to prevent longitudinal expansion of the shirred tube responsive to the inhibition of water by the casing.

Having described the invention in detail what is claimed as new is:

1. A shirred casing article comprising:
    a. a length of cellulosic casing having a moisture content insufficient for stuffing said casing to a recommended stuffed diameter for said casing, said casing being in shirred form to provide a tube of shirred casing composed of pleats formed one against another and said pleats defining a bore through said tube, and said pleats being capable of swelling and expanding longitudinally responsive to the imbibition of additional water;

b. said casing having a first end which is closed thereby closing a corresponding first end of said bore and the opposite second end of said bore being open to permit entry of a stuffing horn into said bore;

c. hanger means attached to said casing at said closed end including a closed loop for suspending said casing after the stuffing thereof;

d. restraining means extending from said closed first end and removably disposed longitudinally about said tube of shirred casing and extending across the open second end of said bore for restraining the swelling and longitudinal expansion of said pleats comprising said tube of shirred casing responsive to imbibition of water by said casing; and e. said restraining means comprising said closed loop wherein said closed loop has a total length sufficient for locating longitudinally about said tube of shirred casing and said closed loop being removable from about said shirred casing for use as said hanger means to suspend said casing after the stuffing thereof.

2. A shirred casing article as in claim 1 including a clip closing said casing first end and comprising means for attaching said closed loop to said casing closed end.

3. A shirred casing article as in claim 1 wherein said hanger means is a tie having a first portion wrapped transversely about said casing and closing said bore first end, and a second portion forming said closed loop which extends longitudinally about said tube of shirred casing and said closed loop comprising said restraining means.

4. A shirred casing article as in claim 1 wherein said restraining means is elastic.

5. A shirred casing article as in claim 1 wherein said casing is a fibrous casing.

6. A shirred casing article as in claim 1 wherein said casing has a water content of less than about 10% of total casing weight.

7. A shirred casing article as in claim 1 wherein the total length of casing contained in said shirred tube is not greater than about 3 meters.

* * * * *